(No Model.)
A. SANFORD.
ICE HOOK AND PICK.
No. 457,219. Patented Aug. 4, 1891.
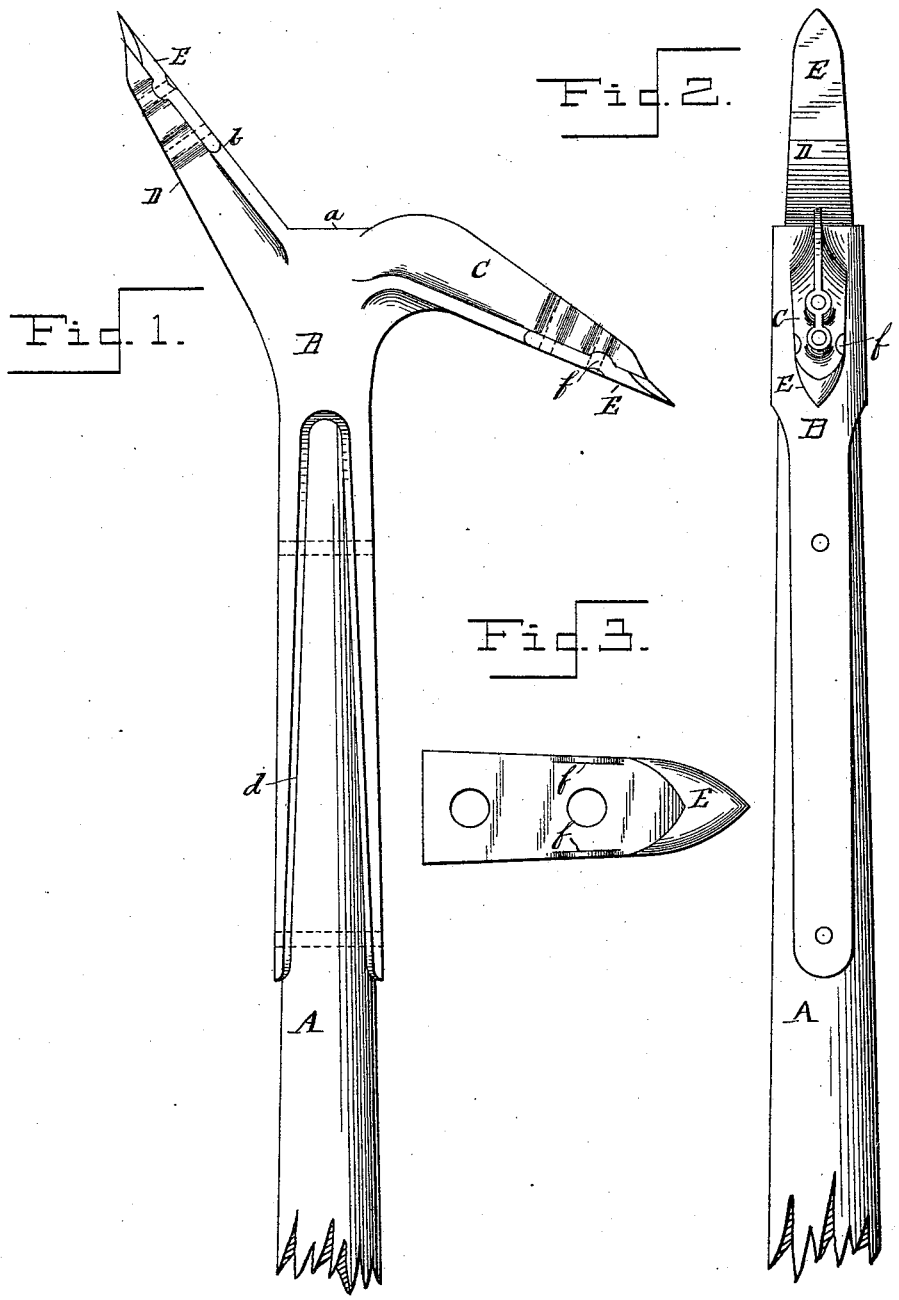
Witnesses
W. H. Courtland
J. E. Spaeth
Inventor
Albert Sanford
by Ross Head
Atty

UNITED STATES PATENT OFFICE.

ALBERT SANFORD, OF OSHKOSH, WISCONSIN.

ICE HOOK AND PICK.

SPECIFICATION forming part of Letters Patent No. 457,219, dated August 4, 1891.

Application filed April 8, 1891. Serial No. 388,342. (No model.)

*To all whom it may concern:*

Be it known that I, ALBERT SANFORD, a citizen of the United States, residing at the city of Oshkosh, in the county of Winnebago and State of Wisconsin, have invented certain new and useful Improvements in Ice Hooks and Picks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an implement used in moving and storing ice; and the objects of my invention are to simplify the construction and render more durable the implement.

In the accompanying drawings, Figure 1 is a side view; Fig. 2, a view on a plane at right angles to Fig. 1, and Fig. 3 a detail view of the implement.

Similar letters refer to similar parts throughout the several views.

A is the handle; B, the socket; C, the hook used to pull the ice, and D the pick used to push the ice.

In my invention both the hook C and the pick D are integral with the socket B, the pick extending in the opposite direction from the hook. The socket, pick, and hook are cast in one piece, preferably of malleable iron, and steel points E E may be provided, riveted or otherwise attached to both the pick and hook. This feature renders the implement more durable.

I allow the handle A to extend through the socket at $a$, so that it may be wedged, if desired, and also to facilitate the removal thereof, if broken, at any time. The socket is slotted, as shown at $d$, so as to permit it to spring over the handle, thus enabling a close fit to be made without making the parts absolutely true.

The handle A may be attached to the socket B in different ways. In the implement shown the socket partly surrounds the handle, and may be riveted, screwed, or bolted thereto by the rivets or screws $n$ $n$ $n$ $n$.

I am aware that implements of this class have heretofore been constructed; but owing to their complexity, and being of several different parts, they have have failed to give proper satisfaction as regards durability. My invention is cheaper in manufacture, simpler in construction, and more durable in use. It is also more easily repaired if the handle becomes broken. The steel points E E are invaluable as regards durability. They may entirely or partially surround the end of the hook or pick. They are preferably set with screws in the ends of the hooks and riveted fast, abutting at their rear ends against an undercut wall of the hook, as shown at $b$, and are provided with ears $f$ at the sides to everlap the hook proper.

In implements of this kind it is necessary that the pike or pick D extend outward from the line of the handle in order that it may thoroughly be struck into the cake of ice. Therefore

What I claim as my invention, and desire to secure by Letters Patent, is—

1. In an ice-handling tool comprising a piece having a central socket-like portion for the reception of the handle, a forwardly-extended and laterally-divergent pushing or picking arm, and a backwardly-extended and laterally-divergent pulling or hooking arm, all the parts being integral, substantially as described.

2. An ice-handling tool comprising a piece having a central socket-like open-sided springy portion for the reception of the handle, a forwardly-extended and laterally-divergent pushing or picking arm, and a backwardly-extended and laterally-divergent pulling or hooking arm, all the parts being integral, substantially as described.

3. An ice-handling tool comprising a piece having a central socket-like open-sided springy portion for the reception of the handle, a forwardly-extended and laterally-divergent pushing or picking arm, and a backwardly-extended and laterally-divergent pulling or hooking arm, and each of said arms being constructed with an undercut shoulder or wall and provided with ears, and a depression for the reception and confinement by suitable means of removable steel points E, substantially as described.

In testimony whereof I affix my signature in presence of two witnesses.

ALBERT SANFORD.

Witnesses:
EDWIN CLIFFORD,
CHARLES J. SCHMITT.